United States Patent
Schade et al.

(10) Patent No.: US 6,689,827 B1
(45) Date of Patent: Feb. 10, 2004

(54) TRANSPARENT IMPACT-RESISTANT MODIFIED THERMOPLASTIC MOLDING MATERIALS

(75) Inventors: Christian Schade, Ludwigshafen (DE); Rainer Neumann, Mutterstadt (DE); Claudia Messinger, Mannheim (DE); Klaus Benker, Neustadt (DE); Armin Kurps, Böhl-Iggelheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/381,047

(22) PCT Filed: Mar. 18, 1998

(86) PCT No.: PCT/EP98/01552

§ 371 (c)(1),
(2), (4) Date: Sep. 14, 1999

(87) PCT Pub. No.: WO98/45365

PCT Pub. Date: Oct. 15, 1998

(30) Foreign Application Priority Data

Apr. 3, 1997 (DE) .......... 197 13 895

(51) Int. Cl.[7] .................. C08K 5/51
(52) U.S. Cl. .......... 524/153; 523/136; 524/120; 524/151; 524/153; 524/291; 525/902
(58) Field of Search .......... 524/151, 153, 524/291, 120; 525/902; 523/136

(56) References Cited

U.S. PATENT DOCUMENTS

| | | | | |
|---|---|---|---|---|
| 3,039,993 A | * | 6/1962 | Friedman | 524/120 |
| 4,036,719 A | * | 7/1977 | Lyons | 523/136 |
| 4,393,164 A | | 7/1983 | McKee et al. | 525/83 |
| 5,008,313 A | * | 4/1991 | Kishida et al. | 524/120 |
| 5,166,238 A | * | 11/1992 | Nakano et al. | 524/120 |
| 5,166,239 A | * | 11/1992 | Memon et al. | 524/151 |
| 5,248,713 A | * | 9/1993 | Lunk et al. | 524/120 |
| 5,258,423 A | * | 11/1993 | Crabb et al. | 523/136 |
| 5,393,817 A | * | 2/1995 | Deckers et al. | 525/902 |
| 5,451,624 A | | 9/1995 | Memon et al. | 524/151 |
| 5,489,633 A | * | 2/1996 | Deckers et al. | 524/153 |
| 5,599,863 A | * | 2/1997 | Zimmerman | 523/136 |
| 5,969,042 A | * | 10/1999 | Tiefensee et al. | 525/238 |

FOREIGN PATENT DOCUMENTS

| | | |
|---|---|---|
| CA | 989992 | 5/1976 |
| EP | 062 223 | 10/1982 |
| EP | 508173 | 4/1991 |
| EP | 426499 | 5/1991 |

OTHER PUBLICATIONS

Encyclopedia of Polymer Sciences and Engineering, vol. 1, 1985, pp. 401–425.

* cited by examiner

Primary Examiner—Veronica P. Hoke
(74) Attorney, Agent, or Firm—Keil & Weinkauf

(57) ABSTRACT

The invention relates to transparent, impact-resistant thermoplastic molding materials containing A) a matrix consisting of at least two different mixture components, B) an impact-resistance modifier, C) an additive, essentially consisting of $c_1$) at least one 2,6-disubstituted phenol, and $c_{21}$) at least one organic phosphite of general formula (I) $P(OR^1)_n(OAr)_{3-n}$, $c_{22}$ at least one organic phosphite of general formula (IIa) and/or (IIb), or $c_{23}$) a mixture of compounds in accordance with $c_{21}$) and $c_{22}$).

13 Claims, No Drawings

TRANSPARENT IMPACT-RESISTANT MODIFIED THERMOPLASTIC MOLDING MATERIALS

The present invention relates to transparent, impact-modified thermoplastic molding compositions comprising
A) a matrix of at least two different blend components,
B) impact-modifier,
C) an additive consisting essentially of
 $c_1$) at least one 2,6-disubstituted phenol and
 $c_{21}$) at least one organic phosphite of the formula (I)

where:
 $R^1$ is $C_6$–$C_{30}$-alkyl in straight-chain and/or branched form or $C_6$–$C_{20}$-cycloalkyl, in each case substituted or unsubstituted,
 Ar is $C_6$–$C_{20}$-aryl or heteroaryl, in each case substituted or unsubstituted,
 n is 1, 2 or 3, where a number of radicals $R^1$ or Ar in (I) are identical or different, or
 $c_{22}$) at least one organic phosphite of the formula (IIa) and/or (IIb)

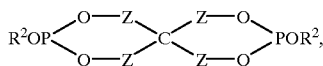

where:
 $R^2$ is $C_6$–$C_{30}$-alkyl in straight-chain and/or branched form or $C_6$–$C_{20}$-cycloalkyl, in each case substituted or unsubstituted,
 $X^1$ and $X^2$ are $C_1$–$C_{20}$-alkyl or $C_1$–$C_{20}$-alkoxy, $C_3$–$C_{20}$-cycloalkyl, $C_6$–$C_{20}$-aryl or -aryloxy, $C_7$–$C_{30}$-aralkyl, the radicals named being substituted or unsubstituted,
 or hydrogen, hydroxyl, NR'R", where R' and R" are hydrogen, $C_1$–$C_6$-alkyl, $C_6$–$C_{20}$-aryl, $C_7$–$C_{30}$-aralkyl or $C_3$–$C_6$-cycloalkyl;
 or, together with carbon, are a $C_3$–$C_{10}$-carbocycle or a $C_2$–$C_{10}$-heterocycle containing one or more heteroatoms selected from groups VA or VIA of the Periodic Table of the Elements, the cyclic structures named being substituted or unsubstituted; or carbonyl or thiocarbonyl;
 Z is unsubstituted or substituted $C_1$–$C_{10}$-alkylene or $C_6$–$C_{20}$-arylene, —Si($R^3$)($R^4$)— or —$R^5$—Si($R^3$)($R^4$)—$R^6$—, where
 $R^3$ and $R^4$ are $C_1$–$C_{10}$-alkyl, $C_6$–$C_{14}$-aryl or aralkyl having a $C_1$–$C_{10}$-alkyl unit and a $C_6$–$C_{10}$-aryl unit, in each case substituted or unsubstituted,
 $R^5$ and $R^6$ are $C_1$–$C_5$-alkylene, $C_6$-arylene, the radicals Z in (IIa) or (IIb) being identical or different; or
 $c_{23}$) a mixture of compounds defined under $c_{21}$) and $c_{22}$).

The invention also relates to a process for preparing transparent, impact-modified thermoplastics and to their use for producing shaped articles, fibers and films. The invention relates, furthermore, to these films, fibers and shaped articles, and also to the use of these for producing packaging material or for producing equipment for medical engineering or for medical diagnostics. The invention also relates to transparent packaging material and transparent equipment for medical engineering or for medical diagnostics.

Thermoplastic materials are frequently not completely inert to light, high-energy radiation (eg. γ radiation), moisture, oxygen or heat or various combinations of these agents, with the result that, during processing or storage, they tend to discolor or suffer impairment in other characteristics. In order to bring such disadvantages under control, suitable stabilizers and/or stabilizer systems are usually added to thermoplastic molding compositions. Stabilizing additives for thermoplastic molding compositions are known. However, although a wide variety of different stabilizers are available to the person skilled in the art, it has hitherto not been possible to find a satisfactory method for color-stabilization of transparent, impact-modified molding compositions whose matrix is built up from at least two different blend components. This stems, inter alia, from the fact that the suitability of stabilizer systems cannot be reliably predicted, even within thermoplastic formulations which are related. In the case of thermoplastics which comprise several blend components, it is often possible only to find a stabilizer which gives satisfactory results for one of the blend components, but not for the other materials of the blend or for the entire system. In transparent thermoplastic molding compositions, moreover, discoloration is particularly easy to detect, so that particularly high requirements have to be placed upon the stabilizer system.

Stabilizing additives for methacrylate-butadiene-styrene (MBS) core-shell graft copolymers are known, for example, from U.S. Pat. No. 5,451,624. These are combinations of at least one sterically hindered phenol, an organic phosphite, an organic sulfide and a buffer system, with the use of which, however, it is not possible to avoid cloudiness in transparent thermoplastic molding compositions. In addition, the scope of application of these stabilized molding compositions is considerably limited by the sulfur compounds used, the intrinsic characteristic odor of which can never be completely suppressed.

EP-A 426 499 describes stabilizing formulations for MBS modifiers made from a sterically hindered phenol, a less hindered phenol and a phosphite. These systems, however, give problems, especially with respect to the discoloration of transparent polymers.

It is an object of the present invention to provide effective stabilizers and/or stabilizer systems, in particular for impact-modified, transparent molding compositions.

We have found that this object is achieved by means of the transparent, impact-modified thermoplastic molding compositions described at the outset.

The invention also provides a process for preparing transparent, impact-modified thermoplastics, and their use for producing shaped articles, fibers and films.

The invention furthermore provides films, fibers and shaped articles, and also the use of these for producing packaging material or for producing equipment for medical engineering or for medical diagnostics. The invention also provides transparent packaging material and transparent equipment for medical engineering or for medical diagnostics.

Preference is given to transparent, impact-modified thermoplastic molding compositions comprising
A) a matrix of at least two different blend components,
B) impact-modifier, C) an additive consisting essentially of
   $c_1$) at least one 2,6-disubstituted phenol and
   $c_{21}$) at least one compound of the formula (I)

$$P(OR^1)_n(OAr)_{3-n} \quad (I),$$

where:
   $R^1$ is $C_6$–$C_{20}$-alkyl, $C_6$–$C_{10}$-cycloalkyl, in each case substituted or unsubstituted, eg. n-hexyl, n-heptyl, n-octyl, i-octyl, n-dodecyl, cyclohexyl, cycloheptyl or 1-methylcyclohexyl,
   Ar is unsubstituted or substituted $C_6$–$C_{10}$-aryl, eg. phenyl, naphthyl or tolyl,
   n is 1, 2, 3, or
   $c_{22}$) at least one compound of the formula (IIb)

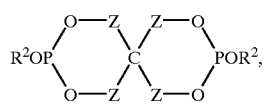

where:
   $R^2$ is unsubstituted or substituted $C_6$–$C_{20}$-alkyl, eg. n-hexyl, n-heptyl, n-octyl, i-octyl, n-dodecyl, cyclohexyl, cycloheptyl or 1-methylcyclohexyl,
   Z is $C_1$–$C_3$-alkylene, such as methylene, 1,2-ethylene or 1,3-propylene, or o-, m- or p-phenylene, in each case unsubstituted or substituted, where the radicals Z or $R^2$ in (IIb) are identical or different; or
   $c_{23}$) a mixture of compounds as defined under $c_{21}$) and $c_{22}$)

Suitable blend components for the matrix A) of the novel thermoplastic molding compositions are, for example, polyalkyl, such as polymethyl methacrylate, polyethyl methacrylate and poly-2-ethylhexyl methacrylate, styrene-acrylonitrile copolymers, such as the SAN Component Luran® (BASF AG), styrene-acrylonitrile-methyl methacrylate copolymers, styrene-maleic anhydride copolymers, styrene-methyl methacrylate copolymers, styrene-butadiene block copolymers, such as Styrolux® (BASF AG), acrylonitrile-butadiene-styrene copolymers, such as the ABS component Terluran® (BASF AG), or acrylonitrile-styrene-acrylate copolymers, such as the ASA component Luran® S (BASF AG), or the corresponding impact-modified polymers. In principle, the formulation of the blend components in the matrix can be as desired.

Preference is given to a matrix based on an impact-modified polymethyl methacrylate-styrene-acrylonitrile copolymer blend.

Instead of the polymethyl methacrylate component here, it is also possible to use a copolymer of methyl methacrylate and alkyl acrylates, preferably methyl acrylate or butyl acrylate, the proportion derived from methyl methacrylate making up at least 60% by weight, preferably more than 80% by weight and in particular more than 90% by weight. The copolymer advantageously has a mean molecular weight $\overline{M}_w$ greater than 50,000 g/mol, preferably greater than 75,000 g/mol and particularly preferably greater than 100,000 g/mol. Besides methyl acrylate and butyl acrylate, suitable alkyl acrylates are in principle those having from 1 to 8 carbon atoms in the alkyl radical. Examples of such $C_1$–$C_8$-alkyl acrylates are: ethyl acrylate, propyl acrylate, n-pentyl acrylate, n-hexyl acrylate, n-heptyl acrylate, n-octyl acrylate and 2-ethylhexyl acrylate and mixtures of these, but in particular methyl acrylate, ethyl acrylate, n-butyl acrylate, 2-ethylhexyl acrylate and mixtures of the last-named compounds, methyl acrylate being particularly preferred.

The methyl methacrylate polymers having an alkyl acrylate content of from 0.5 to 7.0% by weight retain an adequate heat resistance. In principle, the blend components used for the novel thermoplastic molding compositions may be homo- and copolymers having a mean molecular weight $\overline{M}_w$ (determined by light scattering in chloroform) in the range from 50,000 to 30,0000 g/mol.

Methyl methacrylate polymers may be prepared by bulk, solution or bead polymerization by well-known methods (see, for example, Kunststoff-Handbuch, Vol. IX, Polymethacrylate, Vieweg/Esser, Carl-Hanser-Verlag 1975), and are also commercially available.

If a styrene-acrylonitrile copolymer (SAN) is used as blend component, preference is given to such polymers which comprise from 78 to 88% by weight of styrene and from 22 to 12% by weight of acrylonitrile. In a particularly preferred embodiment, the SAN copolymer has a styrene proportion in the range from 80 to 85% by weight and an acrylonitrile proportion of from 20 to 15% by weight. Among these formulations, those particularly preferred have a viscosity number, determined in a 0.5% strength solution in dimethyl formamide, in the range from 30 to 250, preferably from 50 to 150 and particularly preferably from 60 to 120. The copolymers may be prepared by any known process, for example by bulk, solution, suspension or emulsion polymerization. Preference is given to the use of copolymers prepared in solution, a preferred process being described in GB-PS 14 72 195.

Compounds suitable as vinylaromatic components of SAN copolymers are not only styrene, but also styrene having mono- to trisubstitution with $C_1$–$C_8$-alkyl, for example p-methylstyrene or tert-butylstyrene or α-methylstyrene. Styrene, however, is preferred.

Besides acrylonitrile, the vinyl cyanide component of SAN copolymers may be methacrylonitrile or mixtures of acrylonitrile and methacrylonitrile, acrylonitrile being preferred.

One or more impact-modifiers B) are added to the matrix material A). Examples of impact-modifiers are graft copolymers, those with a three-shell structure generally being preferred, but the novel thermoplastic molding compositions may also contain two-shell graft copolymers, as described, for example, in EP-B 0 062 223.

In principle, suitable graft copolymers are those which have a hard shell and a soft core. The graft shell here preferably consists completely or to a substantial extent of one or more methacrylates of $C_1$–$C_8$-alkanols. Particular preference is given to the use of methyl methacrylate, either alone or with addition of small amounts of other acrylates, such as methyl, ethyl, propyl, or butyl acrylate. Besides these, the shell may contain, in parts, vinylaromatic monomers having up to 12 carbon atoms; styrenes substituted on the ring and having up to 12 carbon atoms, and especially styrene itself, are preferred here.

Suitable polymers for the graft base or graft core are copolymers of butadiene and/or isoprene with styrene or with a styrene having up to 12 carbon atoms and substituted in the α position or preferably on the ring with one (or on the ring with one or more) alkyl group(s), preferably methyl.

The core of the graft copolymer preferably has a glass transition temperature below 0° C., particularly preferably below −20° C. The mean particle size of the core is in the range from 30 to 250 nm, particularly preferably from 50 to 180 nm. The core is usually prepared by emulsion polymerization, for example as described in the Encyclopedia of Polymer Science and Engineering, 1985, Vol. 1, p. 401 ff.

In a preferred embodiment, the graft copolymers used for impact-modification of the novel molding compositions have an additional inner shell between the soft core and the hard outer shell. This graft shell usually comprises a vinylaromatic monomer, an alkyl methacrylate or acrylate and, if desired, a crosslinking monomer.

The vinylaromatic monomer used here may be the compounds described above.

Suitable alkyl methacrylates are in particular the $C_1$–$C_8$-alkyl esters, such as methyl methacrylate, ethyl methacrylate, n-propyl methacrylate, isopropyl methacrylate, n-butyl methacrylate, isobutyl methacrylate, sec-butyl methacrylate, tert-butyl methacrylate, n-pentyl methacrylate, n-hexyl methacrylate, n-heptyl methacrylate, n-octyl methacrylate or 2-ethylhexyl methacrylate or mixtures of these monomers, methyl methacrylate being particularly preferred.

The alkyl acrylates which may be used are correspondingly likewise the $C_1$–$C_8$-alkyl esters. Preference is given to methyl, ethyl, n-butyl and 2-ethylhexyl acrylate, in particular n-butyl acrylate.

Crosslinking monomers are essentially di- or polyfunctional comonomers, particular preference being given to alkylene glycol dimethacrylates, such as ethylene glycol dimethacrylate, propylene glycol dimethacrylate and butylene glycol dimethacrylate and similarly to allyl methacrylate, methacrylates of glycerol, trimethylolpropane and pentaerythritol, and vinylbenzenes, such as di- and trivinylbenzene.

In principle, use may be made of thermoplastic molding compositions in which the weight ratio of matrix A) to impact-modifier B) is in the range from 99:1 to 1:99.

In a preferred embodiment, the impact-modified matrix material comprising at least two blend components consists of a mixture of from 4 to 80% by weight, particularly preferably from 15 to 70% by weight and in particular from 20 to 40% by weight, of a methyl methacrylate polymer comprising from 90 to 100% by weight of methyl methacrylate and from 10 to 0% by weight of an alkyl acrylate having from 1 to 8 carbon atoms in the alkyl radical, from 5 to 70% by weight, particularly preferably from 10 to 50% by weight and in particular from 20 to 45% by weight, of a styrene-acrylonitrile copolymer comprising from 78 to 88% by weight of styrene and from 22 to 12% by weight of acrylonitrile and from 15 to 91% by weight, particularly preferably from 20 to 50% by weight, and in particular from 25 to 45% by weight, of a graft copolymer consisting of from 50 to 80% by weight, based on the graft copolymer, of an elastomeric graft base having a glass transition temperature below –20° C., consisting of from 60 to 90% by weight of butadiene or isoprene and from 10 to 40% by weight of styrene or an alkylstyrene having up to 12 carbon atoms, and of from 20 to 50% by weight of a hard graft shell, consisting of from 40 to 100% by weight of one or more methacrylates of $C_1$–$C_8$-alkanols, from 0 to 60% by weight of a vinylaromatic monomer having up to 12 carbon atoms and from 0 to 2% by weight of a crosslinking monomer.

In a further preferred embodiment, the impact-modified matrix comprises a mixture of from 4 to 80% by weight, particularly preferably from 10 to 60% by weight and in particular from 15 to 50% by weight of a methyl methacrylate polymer consisting of from 90 to 100% by weight, based on the methyl methacrylate polymer, of methyl methacrylate and from 0 to 10% by weight of a $C_1$–$C_8$-alkyl acrylate, and from 5 to 90% by weight, particularly preferably from 10 to 70% by weight and in particular from 15 to 60% by weight of a styrene-acrylonitrile copolymer consisting of, based on the SAN copolymer, from 78 to 88% by weight of styrene and from 12 to 22% by weight of acrylonitrile, and from 10 to 91% by weight, particularly preferably from 15 to 60% by weight and in particular from 15 to 40% by weight of a graft copolymer consisting of, based on the graft copolymer, from 40 to 80% by weight of a graft core consisting of from 65 to 90% by weight of butadiene or isoprene and from 10 to 35% by weight of styrene, and from 10 to 30% by weight of a first graft shell consisting of from 30 to 95% by weight, in particular from 30 to 60% by weight, of styrene and from 5 to 70% by weight of a $C_1$–$C_8$-alkyl acrylate and from 0 to 2% by weight of a crosslinking monomer, and from 10 to 30% by weight of a second graft shell consisting of from 70 to 100% by weight of a $C_1$–$C_8$-alkyl methacrylate and from 0 to 30% by weight of a $C_1$–$C_8$-alkyl acrylate.

In the abovementioned formulations, the blend components and the graft copolymer give a total of 100% by weight.

In a further preferred embodiment, the impact-modified matrix comprises from 10 to 60% by weight, preferably from 20 to 50% by weight, of a methyl methacrylate polymer obtainable by polymerizing a mixture consisting of from 90 to 100% by weight, preferably from 92 to 98% by weight, based on the methyl methacrylate polymer, of methyl methacrylate, and from 0 to 10% by weight, preferably from 2 to 8% by weight, based on the methyl methacrylate polymer, of a $C_1$–$C_8$-alkyl acrylate, and from 10 to 70% by weight, preferably from 20 to 40% by weight, of a copolymer obtainable by polymerizing a mixture consisting of from 75 to 88% by weight, preferably from 79 to 85% by weight, based on the copolymer, of a vinylaromatic monomer, preferably styrene, and from 12 to 25% by weight, preferably from 15 to 21% by weight, based on the copolymer, of a vinyl cyanide, preferably acrylonitrile, and from 15 to 50% by weight, preferably from 20 to 40% by weight, of a graft copolymer obtainable from from 40 to 80% by weight, preferably from 50 to 75% by weight, based on the graft copolymer, of a core obtainable by polymerizing a monomer mixture consisting of from 65 to 90% by weight, preferably from 70 to 85% by weight, of a 1,3-diene, preferably butadiene or isoprene, and from 10 to 65% by weight, preferably from 15 to 30% by weight, of a vinylaromatic monomer, preferably styrene, and from 10 to 30% by weight, preferably from 10 to 25% by weight, based on the graft copolymer, of a first graft shell obtainable by polymerizing a monomer mixture consisting of from 30 to 60% by weight, preferably from 40 to 50% by weight, of a vinylaromatic monomer, preferably styrene, from 40 to 60% by weight, preferably from 40 to 55% by weight, of a $C_1$–$C_8$-alkyl methacrylate and from 0 to 2% by weight, preferably from 0 to 1.2% by weight, of a crosslinking monomer and from 10 to 30% by weight, preferably from 10 to 25% by weight, based on the graft copolymer, of a second graft shell obtainable by polymerizing a monomer mixture consisting of from 70 to 98% by weight, preferably from 75 to 92% by weight, of a $C_1$–$C_8$-alkyl methacrylate and from 2 to 30% by weight, preferably from 8 to 25% by weight, of a $C_1$–$C_8$-alkyl acrylate, where the percentages of methyl methacrylate polymer, of the second copolymer and of the graft copolymer give a total of 100% by weight. The last-named embodiment is particularly preferred, especially when the quantity ratio of first graft shell to second graft shell is in the range from 2:1 to 1:2, the refractive index of the first graft shell is higher than that of the second graft shell, and the refractive index of the entire graft shell is lower than that of the core, where the magnitude of the difference between the refractive index of the graft copolymer and that of the impact-modified matrix is less than or equal to 0.02.

The ranges and preferred ranges indicated above for the graft copolymers may be applied similarly to any desired impact-modified matrix system according to the invention.

It is moreover possible to add to the impact-modified matrix materials described above conventional additives in amounts of up to 20% by weight, preferably in amounts of from 0 to 10% by weight, based on the sum of the above-mentioned components, as long as these do not impair the transparency of the matrix material. Examples of such additives are: styrene-maleic anhydride copolymer, dyes, lubricants and antistats.

If a three-shell graft copolymer is used, the quantity ratio of intermediate shell to outer shell is preferably in the range from 2:1 to 1:2.

The two graft shells are prepared in the presence of the core by methods known from the literature, in particular by emulsion polymerization (cf. Encyclopedia of Polymer Science and Engineering, 1985, Vol. 1, p.401 ff.).

In the seeding procedure used, there is no formation of new particles during the preparation of the two graft shells. The seeding procedure moreover permits the number and type of particles in both grafts to be determined via the amount and type of emulsifier used. The emulsion polymerization is usually initiated by polymerization initiators.

In the emulsion polymerization, it is possible to use ionogenic and non-ionogenic emulsifiers.

Examples of suitable emulsifiers are dioctyl sodium sulfosuccinate, sodium lauryl sulfate, sodium dodecyl benzenesulfonate, alkylphenoxypolyethylenesulfonates and salts of long-chain carboxylic and sulfonic acids.

Examples of non-ionogenic emulsifiers are fatty alcohol polyglycol ethers, alkylaryl polyglycol ethers, fatty acid monoethanolamides, ethoxylated fatty amides and ethoxylated fatty amines.

The total amount of emulsifier, based on the total weight of the emulsion graft copolymer, is preferably from 0.05 to 5% by weight.

Polymerization initiators which may be used are ammonium and alkali metal peroxodisulfates, such as potassium peroxodisulfate, and combined initiator systems, such as sodium persulfate, sodium hydrosulfite, potassium persulfate, sodium formaldehydesulfoxylate and potassium peroxodisulfate, sodium dithionite-iron(II) sulfate; in the case of the ammonium and alkali metal peroxodisulfates, which must be activated by heat, the polymerization temperature may be from 50 to 100° C., and in the case of the combined initiators which act as redox systems, it may be lower than this, for example in the range from 20 to 50° C.

The total amount of initiator is preferably between 0.02 and 1.0% by weight, based on the finished emulsion polymer.

It is also possible to use polymerization regulators, both in preparing the base, i.e. the core, and in preparing the two grafts, i.e. the first and second graft shell. Examples of polymerization regulators are alkyl mercaptans, such as n-dodecyl or tert-dodecyl mercaptan. The polymerization regulators are usually used in an amount of from 0.01 to 1.0% by weight, based on the respective core or shell.

In other respects, the emulsion graft copolymer to be used according to the invention is prepared by taking an aqueous mixture consisting of monomers, crosslinker, emulsifier, initiator, regulator and a buffer system in a reactor in which inert conditions have been established using nitrogen, stirring the mixture cold to create inert conditions and then bringing it to the polymerization temperature over the course of from 15 to 120 minutes. It is then polymerized to a conversion of at least 95%. Monomers, crosslinker, emulsifier, initiator and regulator may also be introduced, entirely or to some extent, as a feed to the initial aqueous charge.

After the reaction has continued for from 15 to 120 minutes, if desired, the graft shells are produced by emulsion polymerization by feeding the monomers in the presence of the core which has already formed.

The emulsion graft copolymer is isolated from the resultant latex in a known manner by precipitation, filtration and then drying. For the precipitation, it is possible to use, for example, aqueous solutions of inorganic salts, such as sodium chloride, sodium sulfate, magnesium sulfate and calcium chloride, aqueous solutions of salts of formic acid, such as magnesium formate, calcium formate and zinc formate, aqueous solutions of inorganic acids, such as sulfuric and phosphoric acid, aqueous solutions of ammonia and amines, and other alkaline aqueous solutions, eg. of sodium hydroxide and potassium hydroxide.

The drying can, for example, be carried out by freeze-drying, spray-drying, fluidized-bed drying and air-circulation drying.

In other respects, the details given in EP-B 0 062 223 apply to the preparation of transparent, impact-modified matrix materials which comprise at least two blend components and which can be used as a basis for the novel molding compositions.

According to the invention, the transparent, impact-modified thermoplastic molding compositions contain as additive, for stabilization, in particular to prevent cloudiness and yellowing, a mixture of at least one 2,6-disubstituted phenol and at least one organic phosphite (component C).

Examples of 2,6-disubstituted phenols suitable as additive components $c_1$) are compounds of the following formula (III)

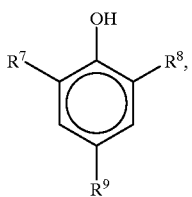

(III)

where:

$R^7$ and $R^8$ independently of one another are $C_1$–$C_{10}$-alkyl in straight-chain or branched form, unsubstituted or substituted, eg. with $C_1$–$C_4$-alkyl, $C_6$–$C_{10}$-aryl or halogen, for example methyl, ethyl, isopropyl, n-propyl, isobutyl, n-butyl, sec-butyl, tert-butyl or pentyl, hexyl, octyl, or their structural analogs, in particular methyl or tert-butyl; $C_3$–$C_{10}$-cycloalkyl, unsubstituted or substituted, eg. with $C_1$–$C_4$-alkyl, $C_6$–$C_{10}$-aryl or halogen, for example cyclopropyl, cyclopentyl, cyclohexyl, 1-methylcyclopropyl, 1-methylcyclopentyl or 1-methylcyclohexyl, in particular 1-methylcyclohexyl; $C_6$–$C_{20}$-aryl, unsubstituted or substituted, eg. with $C_1$–$C_4$-alkyl, $C_6$–$C_{10}$-aryl or halogen, for example phenyl, tolyl, xylyl, anisyl or naphthyl, in particular phenyl; aralkyl having a $C_1$–$C_{10}$-alkyl unit and a $C_6$–$C_{10}$-aryl unit, for example benzyl or p-methoxybenzyl, $R^9$ is $C_1$–$C_{10}$-alkyl in straight-chain or branched form, unsubstituted or substituted, eg. with $C_1$–$C_4$-alkyl, $C_6$–$C_{10}$-aryl or halogen, $C_6$–$C_{10}$-aryl, unsubstituted or substituted, eg. with $C_1$–$C_4$-alkyl, $C_6$–$C_{10}$-aryl or halogen, aralkyl having a $C_1$–$C_{10}$-alkyl unit and a $C_6$–$C_{10}$-aryl unit or —$(CH_2)_m CO_2 R^{10}$, where m=from 1–10 and $R^{10}$ is $C_1$–$C_{30}$-alkyl, preferably $C_1$–$C_{20}$-alkyl, in straight-chain or branched form, unsubstituted or substituted, eg. with halogen, for example methyl, ethyl, isopropyl, n-propyl, isobutyl, n-butyl, sec-butyl, tert-butyl or pentyl, hexyl, octyl or their structural analogs, in particular methyl or tert-butyl; $C_3$–$C_{10}$-cycloalkyl, unsubstituted or substituted, eg. with $C_1$–$C_4$-alkyl, $C_6$–$C_{10}$-aryl or halogen, for example cyclopropyl, cyclopentyl, cyclohexyl, 1-methylcyclopropyl, 1-methylcyclopentyl and 1-methylcyclohexyl, in particular 1-methylcyclohexyl; $C_6$–$C_{20}$-aryl, unsubstituted or substituted, eg. with $C_1$–$C_4$-alkyl, $C_6$–$C_{10}$-aryl or halogen, for example phenyl, tolyl, xylyl, anisyl or naphthyl, in particular phenyl; aralkyl having a $C_1$–$C_{10}$-alkyl unit and a $C_6$–$C_{10}$-aryl unit, for example benzyl or p-methoxybenzyl.

Other compounds suitable as components ($c_1$) are those of the following formula (IV)

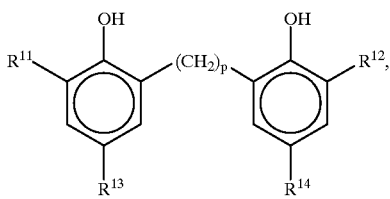

(IV)

where:

$R^{11}$ and $R^{12}$ independently of one another, are the substituents defined under $R^7$ and $R^8$ above, preferably tert-butyl, $R^{13}$ and $R^{14}$ independently of one another, are the substituents defined under $R^9$, preferably methyl, p is 1, 2, 3 or 4, in particular 1, or of the formula (V) below:

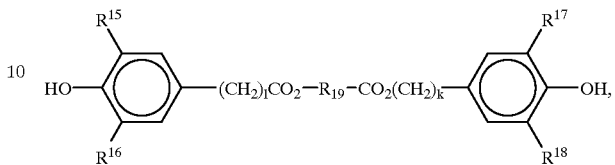

(V)

where:

$R^{15}$ to $R^{18}$, independently of one another, are the substituents defined under $R^7$ and $R^8$, preferably methyl or tert-butyl, $R^{19}$ is $C_1$–$C_{10}$-alkylene, unsubstituted or substituted, —$(CH_2)_2$—[O—$(CH_2)_2]_q$—, where q=from 1 to 3, and l, k, independently of one another, are integers from 0 to 6.

In principle, particularly preferred 2,6-disubstituted phenols are those which have, either in the 2-position or in the 6-position or in both the 2- and in 6-positions, a substituent having a quaternary carbon atom which is directly linked to the aromatic ring, for example tert-butyl or 1'-methylcyclohexyl.

Examples of particularly suitable 2,6-disubstituted phenols are the commercially available octadecyl 3-[3,5-di(1,1-dimethylethyl)-4-hydroxyphenyl]propionate, 1,6-hexanediol bis[3-(3,5-di(1,1-dimethylethyl)-4-hydroxyphenyl)propionate], 2,6-di-tert-butyl-4-methylphenol, 1,6-triethyleneglycol bis[3-(3,5-di(1,1-dimethylethyl)-4-hydroxyphenyl)propionate], butylated reaction products of p-cresol and dicyclopentadiene, eg. CAS Reg. No. [68610-51-52], 2,2'-methylenebis-(4-methyl-6-tert-butylphenol), 2,2'-methylenebis[4-methyl-6-(1-methylcyclohexyl)phenol], 2,2'-isobutylidenebis(4,6-dimethylphenol), α-tocopherol and pentaerythritol tetrakis [3-(3,5-bis(1,1-dimethylethyl)-4-hydroxyphenyl) propionate].

3-[3,5-Di(1,1-dimethylethyl)-4-hydroxyphenyl] propionates are particularly useful, and octadecyl 3-[3,5-di(1,1-dimethylethyl)-4-hydroxyphenyl]propionate and 1,6-hexanediol bis[3-(3,5-di(1,1-dimethylethyl)-4-hydroxyphenyl)propionate] are particularly preferred.

The 2,6-disubstituted phenols listed may be used alone or in a mixture. They are preferably used in amounts of from 0.02 to 5% by weight, particularly preferably in amounts of from 0.05 to 1% by weight and in particular in amounts of from 0.1 to 0.5% by weight, based in each case on the total amount of blend components and graft copolymer.

Other additive components which may be used are one or more organic phosphites of the formula (I) or (II), i.e. (IIa) and/or (IIb), already described in more detail above.

In an embodiment of a compound $c_{22}$) of formula (IIa), $X^1$ and $X^2$, together with carbon, are a $C_3$–$C_{10}$-carbocycle, preferably a $C_5$–$C_{10}$-carbocycle, for example cyclopentyl, cyclohexyl or cycloheptyl, or a $C_2$–$C_{10}$-heterocycle containing one or more heteroatoms from groups VA or VIA of the Periodic Table of the Elements, preferably nitrogen, phosphorus or oxygen, the cyclic structures being substituted or unsubstituted.

In the case of heterocycles containing one or more heteroatoms from group VA of the Periodic Table of the Elements, the free valencies of the heteroatom may be satisfied in a wide variety of ways: in the case of phosphorus, for example, by $C_1$–$C_{30}$-alkyl, preferably $C_6$–$C_{20}$-alkyl, $C_6$–$C_{14}$-aryl, preferably $C_6$–$C_{10}$-aryl, or —O—$C_1$-alkyl to —O—$C_{30}$-alkyl, preferably —O—$C_6$-alkyl to —O—$C_{20}$-alkyl, and in the case of nitrogen, for example, by $C_1$–$C_{30}$-alkyl, preferably $C_6$–$C_{20}$-alkyl or $C_6$–$C_{14}$-aryl, preferably $C_6$–$C_{10}$-aryl.

Besides, for example, phosphorus as heteroatom, other heteroatoms from groups VA or VIA of the Periodic Table of the Elements, such as oxygen, may be present in the heterocycle, giving, for example, —O—P—O— as part of a ring, the free valency of phosphorus being satisfied as described above.

Preference is given to the use of compounds (I) and (II) where $R^1$ and $R^2$ have from 8 to 14 carbon atoms, particularly preferably from 8 to 12 carbon atoms.

Examples of suitable organic phosphites of the formula (I) are triisooctyl phosphite, triisodecyl phosphite, trilauryl phosphite, diisooctyl phenyl phosphite, diisodecyl phenyl phosphite, dilauryl phenyl phosphite, isooctyl diphenyl phosphite, diphenyl isodecyl phosphite and diphenyl lauryl phosphite.

Examples of suitable compounds of the formula (II) are: bislauryl pentaerythritol diphosphite and bisstearyl pentaerythritol diphosphite.

The additive component used may either be an individual compound of the formulae (I) or (II) or a mixture formed from compounds of formula (I) or (II) or (I) and (II).

Each of the organic phosphites (I) and (II) present in the novel thermoplastic molding compositions is preferably present in an amount of from 0.02 to 5% by weight, particularly preferably from 0.05 to 1% by weight and in particular from 0.1 to 0.5% by weight, based on the graft copolymers and the blend components forming the matrix material.

The additive C) may furthermore contain small amounts, usually not more than 5% by weight, based on C), of additional constituents.

The additive components may be added individually or as a mixture, either to the respective components of the thermoplastic molding compositions or as final component to the already assembled components of the thermoplastic molding compositions. If desired, a part of the additive components may be premixed with one or more constituents of the thermoplastic and the rest mixed with the assembled constituents. However, the additive components C) are particularly preferably added to the graft copolymer B) or to the mixture of all of the components.

The additive C) or the individual additive components may be used as powders or in the form of granules in preparing the novel thermoplastic molding compositions. This addition may be either continuous or, in particular if granules are used, may be a batch operation.

The mixing of the blend components, the graft copolymer (s), the additive and, if desired, the other added materials is usually carried out in the melt at from 200 to 280° C., for example by means of melt extrusion.

From the novel thermoplastic molding compositions, it is possible to produce films, fibers and especially moldings, moldings being obtained primarily by injection molding or blow molding. The thermoplastic molding compositions may, however, also be pressed, calendered, extruded or vacuum-formed. The novel thermoplastic molding compositions have in particular good stress cracking resistance and toughness and are transparent. They also have very low haze and show no noticeable yellowing, even when heat-aged.

In addition, the fall-off in toughness under the influence of weathering is delayed. Finally, the novel molding compositions, even on irradiation with high-energy radiation, eg. γ radiation, even on heat-ageing, show only a very small yellowing tendency and retain their good mechanical properties, for example their toughness, ie. no embrittlement of the material is observed. The novel molding compositions, and the films, fibers and shaped articles which can be obtained therefrom, are therefore particularly suitable even as packaging material for, for example, luxury or other foods whose durability is improved by irradiating them with energy-rich radiation.

The novel molding compositions or the films, fibers and shaped articles made from these molding compositions are, furthermore, suitable for use in equipment for medical engineering or for medical diagnostics, in particular where sterilizable transparent material in the form of, for example, catheters, tubes, tube connectors, infusion equipment, dialysis housings or drip chambers.

Using the abovementioned additive components, it is therefore possible to obtain products having a yellowing tendency which is surprisingly extremely low and which at the same time maintain their good mechanical properties. Besides this, the addition of the additive, surprisingly, has a similarly advantageous effect on factors such as melt properties, eg. the melt volume index, transparency, haze, odor, exudation behavior, demolding and frictional characteristics. In addition, other added materials which are used, eg. dyes, are not adversely affected by the stabilizing additive components.

EXAMPLES

For Examples 1 to 4 and the Comparative Examples 1c to 6c, use was made of the copolymers Q1 to Q3 and additives E1 to E10, described in more detail below:

Q1 Copolymer of methyl methacrylate and methyl acrylate in a ratio of 94:6 ($M_w$=111,000 g/mol), Q2 Copolymer of styrene and acrylonitrile in a ratio of 81:19 with a viscosity number of 100, determined in a 0.5% strength solution in dimethylformamide, Q3 Graft copolymer comprising 23% of methyl methacrylate on 22% of styrene and butyl acrylate (90:10) on 55% of butadiene and styrene (72:28), E1 Octadecyl 3-[3,5-di(1,1-dimethylethyl)-4-hydroxyphenyl]propionate (Irganox® 1076, Ciba), E2* 1,1,3-tris(2-methyl-5-tert-butyl-4-hydroxyphenyl) butane (Topanol CA, ICI), E3 1,6-hexanediol bis[3-(3,5-di(1,1-dimethylethyl)-4-hydroxyphenyl)propionate] (Irganox® 259, Ciba), E4* tris(nonylphenyl)phosphite, E5* tris(2,4-di-tert-butylphenyl)phosphite (Irgafos® 168, Ciba), E6* bis(2,4-di-tert-butylphenyl)pentaerythritol diphosphite (Ultranox® 626, General Electric), E7 bisstearyl pentaerythritol diphosphite (Weston® 619, General Electric), E8 diphenyl isooctyl phosphite (Weston® ODPP, General Electric), E9 triisodecyl phosphite (Weston® TDP, General Electric), E10* dilauryl thiodipropionate (Irganox® PS 800, Ciba); (* not according to the invention).

A mixture of 28.1% by weight of Q1, 35.9% by weight of Q2, 36% by weight of Q3 and of each of the stated amounts of the additives was melt-extruded at 250° C. The resultant pellets were injection molded at a melt temperature of 250° C., to give discs of 2 mm thickness.

a) Yellowing Test

The discs described were stored in a heated cabinet for 6 weeks at 90° C.

The yellowness index YI was measured according to ASTM-D 1925.

The yellowness index YI is based on colorimetry figures calculated from the transmission spectrum according to ASTM-D 1925. These are based on illuminant D65 and the wide-field standard observer.

The results of the determination of yellowness index are given in Table 1 below.

TABLE 1

| Example | Additive[a] | | YI before heat aging | YI after heat aging |
|---|---|---|---|---|
| 1c | 0.2 E1 | 0.2 E4 | 3.1 | 14.5 |
| 2c | 0.2 E1 | 0.2 E6 | 3.5 | 18.0 |
| 3c | 0.2 E1 | 0.2 E5 | 3.1 | 16.2 |
| 4c | 0.2 E2 | 0.2 E9 | 3.2 | 15.0 |
| 5c | 0.2 E1 0.15 E2 | 0.2 E5 — | 3.9 | 19.3 |
| 6c | 0.2 E1 | 0.2 E10 | 3.1 | 14.3 |
| Example 1 | 0.2 E1 | 0.2 E7 | 3.2 | 8.0 |
| Example 2 | 0.2 E1 | 0.2 E8 | 3.1 | 8.5 |
| Example 3 | 0.2 E1 | 0.2 E9 | 3.3 | 8.5 |
| Example 4 | 0.2 E3 | 0.2 E7 | 3.2 | 9.2 |

[a] in % by weight, based on the mixture of components Q1, Q2 and Q3 b) toughness test after irradiation

The discs described were irradiated using a $CO^{60}$ source, with a dose of 50 KGy (5 Mrad).

To determine toughness, impact strength was determined according to ISO 179/1 eU, and also penetration energy W-T (DIN 53 443) on discs of 60×2 mm.

The results for unirradiated and irradiated specimens are given in Table 2.

TABLE 2

| | | unirradiated | | | irradiated[d] | | |
|---|---|---|---|---|---|---|---|
| Example | Additive[a] | impact strength[b] [kJ/m²] | W–T[c] | YI[e] | impact strength[b] [kJ/m²] | W–T[c] [Nm] | YI[e] |
| 7c | — | 206 | 14 | 4 | 9 | 2.4 | 30 |
| Ex. 5 | 0.2 E1 0.2 E7 | 195 | 16 | 3.2 | 123 | 12 | 20 |
| Ex. 6 | 0.2 E1 0.2 E8 | 138 | 17 | 3.2 | 139 | 14 | 16 |

[a] in % by weight, based on the mixture of components Q1, Q2 and Q3
[b] determined according to ISO 179/1eU
[c] determined according to DIN 53 443
[d] γ radiation, total amount of radiation: 50 kG/y
[e] determined directly after irradiation

We claim:

1. A transparent, impact-modified thermoplastic molding composition comprising

A) a matrix which is formed from polymethylmethacrylate, or a copolymer of methyl methacrylate and a $C_1$- to $C_8$-alkyl acrylate, and a SAN copolymer, B) as impact modifier a graft copolymer having a graft base or graft core with a glass transition temperature smaller than 0° C., being built from copolymers of butadiene and/or isoprene with styrene or with styrene having up to 12 carbon atoms, which have a mean particle size in the range of 30 to 250 nm, and having grafted thereon an inner graft shell, being built from vinylaromatic monomers and an alkyl methacrylate or acrylate, and an outer graft shell being built from one or more methacrylates of $C_1$- to $C_8$-alkanols, C) an additive consisting essentially of
   $c_1$) at least one 2,6-disubstituted phenol of the formula (III)

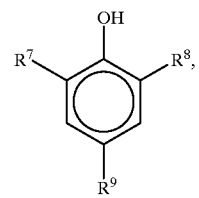

(III)

where:

$R^7$ and $R^8$, independently of one another, are $C_1$–$C_{10}$-alkyl in straight-chain or branched form, $C_3$–$C_{10}$-cycloalkyl, $C_6$–$C_{20}$-aryl, aralkyl having a $C_1$–$C_{10}$-alkyl unit and a $C_6$–$C_{10}$-aryl unit, $R^9$ is $C_1$–$C_{10}$-alkyl in straight-chain or branched form, $C_6$–$C_{10}$-aryl, aralkyl having a $C_1$–$C_{10}$-alkyl unit and a $C_6$–$C_{10}$-aryl unit or —$(CH_2)_m CO_2 R^{10}$ where m=from 1 to 10, and $R^{10}$ is $C_1$–$C_{30}$-alkyl in straight-chain or branched form, $C_3$–$C_{10}$-cycloalkyl, $C_6$–$C_{20}$-aryl, aralkyl having a $C_1$–$C_{10}$-alkyl unit and a $C_6$–$C_{10}$-aryl unit, of the formula (IV)

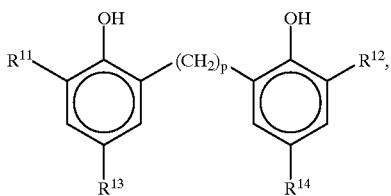

where:
$R^{11}$ and $R^{12}$, independently of one another, are the substituents defined under $R^7$ and $R^8$,
$R^{13}$ and $R^{14}$, independently of one another, are the substituents defined under $R^9$,
p is 1, 2, 3 or 4,
or of the formula (V)

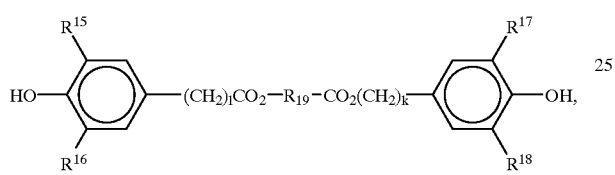

where:
$R^{15}$ to $R^{18}$, independently of one another, are the substituents defined under $R^7$ and $R^8$,
$R^{19}$ is $C_1$–$C_{10}$-alkylene or —$(CH_2)_2$—$[O$—$(CH_2)_2]_q$— where q=from 1 to 3, and
l and k, independently of one another, are integers from 0 to 6,
$c_{21}$) at least one organic phosphite of the formula (I)

$$P(OR^1)_n(OAr)_{3-n} \quad (I),$$

where:
$R^1$ is $C_6$–$C_{30}$-alkyl in straight-chain and/or branched form or $C_6$–$C_{20}$-cycloalkyl, in each case substituted or unsubstituted,
Ar is $C_6$–$C_{20}$-aryl or heteroaryl, in each case substituted or unsubstituted,
n is 1, 2 or 3, where a number of radicals $R^1$ or Ar in (I) are identical or different, or
$c_{22}$) at least one organic phosphite of the formula (IIa) and/or (IIb)

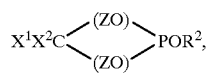

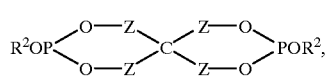

where:
$R^2$ is $C_6$–$C_{30}$-alkyl in straight-chain and/or branched form or $C_6$–$C_{20}$-cycloalkyl, in each case substituted or unsubstituted,
$X^1$ and $X^2$ are $C_1$–$C_{20}$-alkyl or $C_1$–$C_{20}$-alkoxy, $C_3$–$C_{20}$-cycloalkyl, $C_6$–$C_{20}$-aryl or -aryloxy, $C_7$–$C_{30}$-aralkyl, the radicals named being substituted or unsubstituted,
or hydrogen, hydroxyl, NR'R", where R' and R" are hydrogen, $C_1$–$C_6$-alkyl, $C_6$–$C_{20}$-aryl, $C_7$–$C_{30}$-aralkyl or $C_3$–$C_6$-cycloalkyl;
or, together with carbon, are a $C_3$–$C_{10}$-carbocycle or a $C_2$–$C_{10}$-heterocycle containing one or more heteroatoms selected from groups VA or VIA of the Periodic Table of the Elements, the cyclic structures named being substituted or unsubstituted;
or carbonyl or thiocarbonyl;
Z is unsubstituted or substituted $C_1$–$C_{10}$-alkylene or $C_6$–$C_{20}$-arylene, —Si($R^3$)($R^4$)— or —$R^5$—Si($R^3$)($R^4$)—$R^6$—, where
$R^3$ and $R^4$ are $C_1$–$C_{10}$-alkyl, $C_6$–$C_{14}$-aryl or aralkyl having a $C_1$–$C_{10}$-alkyl unit and a $C_6$–$C_{10}$-aryl unit, in each case substituted or unsubstituted,
$R^5$ and $R^6$ are $C_1$–$C_5$-alkylene, $C_6$-arylene, the radicals Z in (IIa) or (IIb) being identical or different; or
$c_{23}$) a mixture of compounds defined under $c_{21}$) and $c_{22}$).

2. A thermoplastic molding composition as claimed in claim 1, containing, as organic phosphite,
$c_{21}$) at least one compound of the formula (I)

$$P(OR^1)_n(OAr)_{3-n} \quad (I),$$

where:
$R^1$ is $C_6$–$C_{20}$-alkyl or $C_6$–$C_{10}$-cycloalkyl, in each case substituted or unsubstituted,
Ar is unsubstituted or substituted $C_6$–$C_{10}$-aryl,
n is 1, 2 or 3, or
$c_{22}$) at least one compound of the formula (IIb)

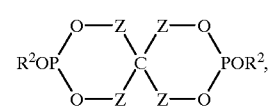

where:
$R^2$ is unsubstituted or substituted $C_6$–$C_{20}$-alkyl,
Z is $C_1$–$C_3$-alkylene or o-, m- or p-phenylene, in each case unsubstituted or substituted, where the radicals Z or $R^2$ in (IIb) are identical or different; or
$c_{23}$) a mixture of compounds as defined under $c_{21}$) and $c_{22}$).

3. A thermoplastic molding composition as claimed in claim 1, where the matrix A) is formed from a copolymer of methyl methacrylate and a $C_1$–$C_8$-alkyl acrylate and a copolymer of styrene and acrylonitrile.

4. A thermoplastic molding composition as claimed claim 1, where, as impact-modifier B), a graft copolymer is used which consists of a graft core formed from butadiene and styrene, a first graft shell formed from styrene and n-butyl acrylate, and a second graft shell formed from methyl methacrylate.

5. A thermoplastic molding composition as claimed in claim 1, containing, as additive components
$c_1$) octadecyl 3-[3,5-di-(1,1-dimethylethyl)-4-hydroxyphenyl]propionate or 1,6-hexanediol bis-[3-(3,5-di(1,1-dimethylethyl)-4-hydroxyphenyl)propionate],
$c_{21}$) triisooctyl phosphite, triisodecyl phosphite, trilauryl phosphite, diisooctyl phenyl phosphite, diisodecyl phenyl phosphite, dilauryl phenyl phosphite, isooctyl diphenyl phosphite, diphenyl isodecyl phosphite or diphenyl lauryl phosphite or c$_{22}$) bislauryl pentaerythritol diphosphite or bisstearyl pentaerythritol diphosphite.

6. A process for preparing the thermoplastic molding compositions as claimed in claim 1, which comprises mixing the blend components forming the matrix A), the impact-modifier B) and the components making up the additive C), if desired in the presence of other added materials, in the melt at from 200 to 300° C.

7. A method of using a thermoplastic molding composition as claimed in claim 1 for producing a film, fiber or shaped article comprising at least one method step from the group consisting of injection molding, blow molding, pressing, calendering, extruding and vacuum-forming.

8. A film, a fiber or a shaped article consisting essentially of thermoplastic molding compositions as claimed in claim 1.

9. A method of using the molding compositions or the films, fibers or shaped articles as claimed in claim 8 as packaging material or for producing equipment for medical engineering or for medical diagnostics comprising at least one method step from the group consisting of injection molding, blow molding, pressing, calendering, extruding and vacuum-forming.

10. A transparent packaging material consisting essentially of thermoplastic molding compositions as claimed in claim 1.

11. Transparent equipment for medical engineering or for medical diagnostics consisting essentially of thermoplastic molding compositions as claimed in claim 1.

12. A thermoplastic molding composition as claimed in claim 1, wherein the inner graft shell comprises a crosslinking monomer.

13. A thermoplastic molding composition as claimed in 1, wherein the graft shell consists completely or to a substantial extent of one or more methacrylates of $C_1$–$C_8$-alkanols.

* * * * *